United States Patent [19]

Edwards et al.

[11] Patent Number: 5,381,500
[45] Date of Patent: Jan. 10, 1995

[54] METAL INSERT AND BUFFER RETENTION PLUNGER

[75] Inventors: Bryan T. Edwards, Camp Hill; David D. Erdman, Hummelstown; Joseph L. McKee, Elizabethtown; Kevin T. Monroe, Harrisburg, all of Pa.

[73] Assignee: The Whitaker Corporation, Wilmington, Del.

[21] Appl. No.: 135,221

[22] Filed: Oct. 12, 1993

[51] Int. Cl.⁶ .................................................. G02B 6/36
[52] U.S. Cl. ................................. 385/78; 385/62; 385/66; 385/81; 385/84
[58] Field of Search ................ 385/60, 62, 66, 78, 385/81, 84

[56] References Cited

U.S. PATENT DOCUMENTS

| | | | |
|---|---|---|---|
| 4,173,389 | 11/1979 | Curtis | 385/92 |
| 4,679,895 | 7/1987 | Huber | 385/87 |
| 4,695,124 | 9/1987 | Himono et al. | 385/78 |
| 4,729,624 | 3/1988 | Kakii et al. | 385/78 |
| 4,802,728 | 2/1989 | Komatsu | 385/78 |
| 4,812,006 | 3/1989 | Osborn et al. | 385/69 |
| 4,961,624 | 10/1990 | Savitsky et al. | 385/81 |
| 5,013,122 | 5/1991 | Savitsky et al. | 385/81 |
| 5,080,460 | 1/1992 | Erdman et al. | 385/81 |
| 5,088,804 | 2/1992 | Grinderslev | 385/81 |
| 5,102,211 | 4/1992 | Slaney et al. | 385/81 |
| 5,113,474 | 5/1992 | Slaney et al. | 385/136 |
| 5,121,455 | 6/1992 | Palecek | 385/69 |
| 5,131,063 | 7/1992 | Monroe et al. | 385/78 |
| 5,208,887 | 5/1993 | Grinderslev | 385/81 |
| 5,216,734 | 6/1993 | Grinderslev | 385/60 |

*Primary Examiner*—Frank Gonzalez
*Attorney, Agent, or Firm*—June B. Schuette

[57] ABSTRACT

A fiber optic termination for incorporating within a fiber optic connector is capable of mechanical assembly which can preclude the use of adhesives for termination assembly. A metal plunger compresses a bullet having an aperture therethrough into a constriction causing the bullet to grip a fiber. A metal insert lines the interior of an alignment ferrule and engages the actuating plunger with an interference fit. The interference fit retains the plunger over time and over a broad operating temperature range. Dimples on the outer surface of the metal insert create pockets of engagement between the insert and the alignment ferrule that resist axial displacement of the insert relative to the alignment ferrule.

23 Claims, 3 Drawing Sheets

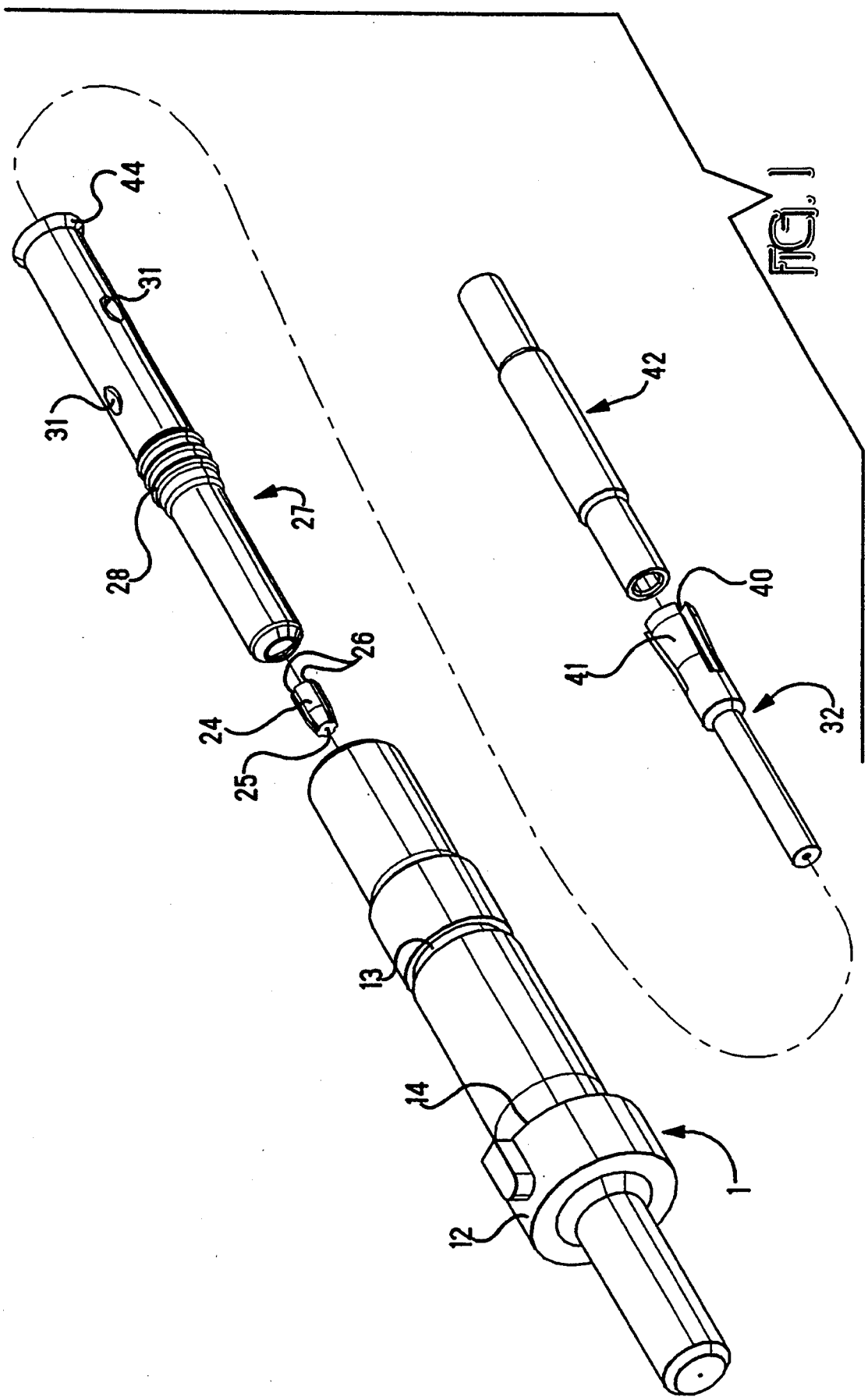

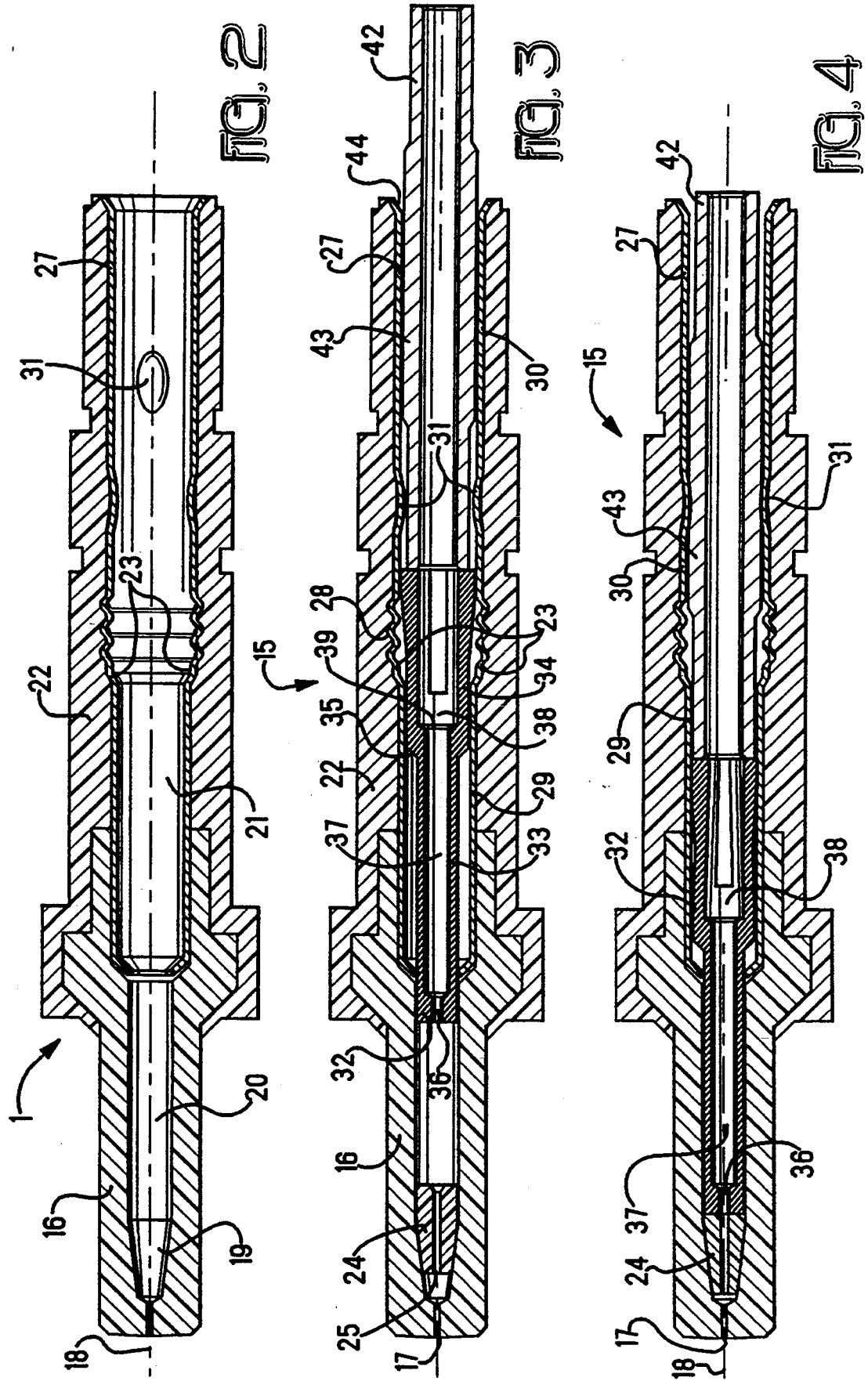

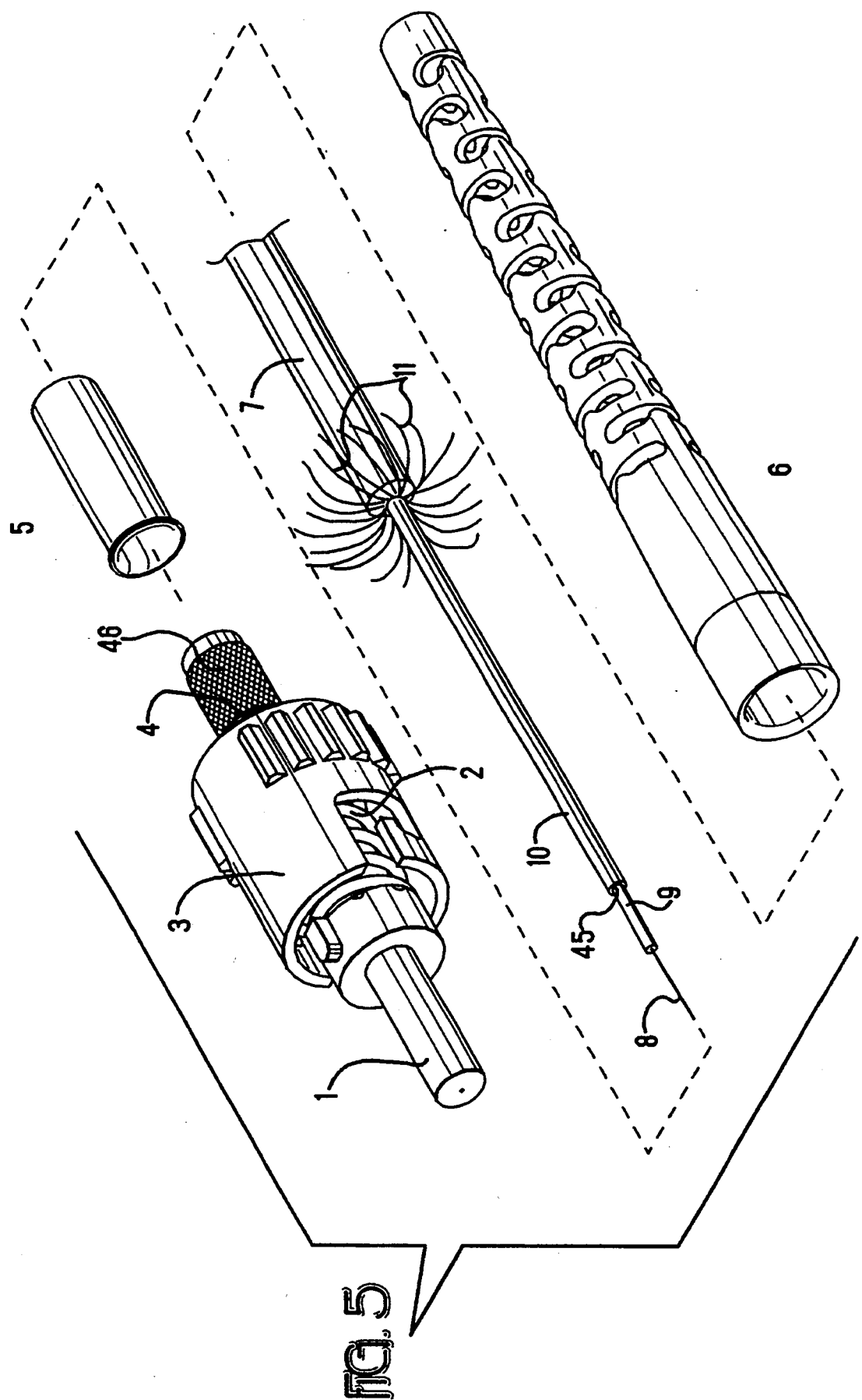

METAL INSERT AND BUFFER RETENTION PLUNGER

FIELD OF THE INVENTION

The present invention relates to terminations for fiber optic cable, and particularly, to an optical connector having instant handling strength that can preclude or augment the use of adhesives during termination assembly.

BACKGROUND OF THE INVENTION

Optical data transmission over light transmitting fiber, continues to be an attractive alternative to other forms of information transfer. Optical fiber has a higher bandwidth and lower signal degradation over the same conductor length than the electrical counterpart. Compactness and immunity to electromagnetic interference renders optical fiber amenable to many types of operating environments.

Many optical connectors use adhesives to bond the fiber to the termination. Fiber optic cable consists of layers of different materials concentric about a fiber. A typical cable consists of a central glass fiber, a coating, a buffer, strands of strength members, and a jacket. As is commonly the case, the fiber is adherent to the coating, but the coating is not adherent to the buffer. Adhesives provide distributed retention of a fiber to the termination by providing a continuous restraint along the length of the termination adhered to the fiber and the buffered fiber. This distributed retention prevents slippage between the fiber and the buffer. Adhesives also provide stability of fiber retention over temperature and time.

Adhesives typically require either heating, a curing time, or both in order to create the desired bond. Many optical termination installations occur in the field and after an optical cable network is in place. Assembly of a termination using a thermoset adhesive requires heating equipment and power. Installation of each termination requires a warm up time for the heating unit and a curing time to set the adhesive bond. Assembly of terminations in many locations, therefore, requires an installer for each termination to (1) move the heating equipment and power, if necessary, to each termination location, (2) wait the warm-up time, (3) assemble the connector, (4) wait the curing time, (5) disassemble the equipment and (6) move to the next location. Systems having instant handling strength can be used either without an adhesive, the mechanical system providing all fiber retention, or in conjunction with an adhesive, the mechanical system providing sufficient retention of the fiber to permit an adhesive to cure over time without operator involvement. Systems having instant handling strength, therefore, can save a great deal of time and effort by obviating the need for heating equipment and power.

U.S. Pat. No. 5,088,804 to Grinderslev discloses a system that terminates a fiber optic cable mechanically and provides instant handling strength. Once the mechanical system is actuated, the fiber is aligned and retained. The mechanical system disclosed in the Grinderslev patent, uses three resilient spheres housed within a hollow alignment ferrule. A hollow plunger and an aperture created by the juxtaposition of the three spheres receives a fiber. The plunger forces the three spheres into a constriction in the alignment ferrule. The resulting deformation of the three spheres causes the aperture to contract and grip the fiber.

Mechanical fiber retention systems provide point sources of force loading for fiber retention. Due to the greater loading of the point source as opposed to the distributed retention system of adhesives, there is a greater risk of slippage between the fiber and the buffer. Slippage between fiber and buffer creates a difference in position between the physical end of the fiber and the physical end of the termination. Should slippage occur, an air gap would be present upon mating two fiber optic terminations causing degradation of the signal.

In mechanical detention systems, it is important that the bullet that grips the fiber be under constant compression over tile and temperature in order to maintain the integrity of the grip. The plunger effects bullet compression, therefore motionless plunger retention maintains the integrity of the grip. U.S. Pat. No. 5,080,460 to Erdman et al. discloses a plunger having annular barbs and a ferrule having corresponding ribs. The barbs frictionally engage the ribs to create an interference fit between the plunger and the ferrule that resists rearward movement of the plunger relative to the ferrule. The multiple ribs of the plunger provide multiple retention points that are beneficial characteristics of a distributed retention system.

Mechanical retention systems also provide multiple cuts on a rear of the plunger that create a collet. Upon engagement of the plunger with the ferrule assembly, the tines of the collet collapse inwardly and grip the buffer. The retention of the buffer by the collet provides an additional retention point that further distributes any load on the termination and resists slippage between the buffer and the fiber. The cuts that create the tines of the collet are wide relative to the fiber diameter. During assembly, the fiber can easily become entangled with the tines which can slow the assembly process. In addition, the manufacturing cost of producing the tines tends to be disproportionately high as compared to the cost of the entire termination.

SUMMARY OF THE INVENTION

According to a feature of the invention, a system for mechanically terminating an optical fiber has a metal insert lining the interior of an alignment ferrule providing greater retention strength of a metal plunger within the metal insert. The plunger engages a bullet that grips a fiber. Greater retention strength of a plunger maintains bullet deformation and fiber gripping. Another advantage of the invention resides in additional flexural and axial rigidity of the ferrule assembly due to the reinforcement properties of the metal insert.

According to another feature of the invention, annular grooves on the insert resist axial displacement of the insert relative to the alignment ferrule.

According to another feature of the invention, detents on the insert protrude radially inward to engage the plunger in an interference fit. An advantage of the interference fit using detents resides in lower precision manufacturing than diametral retention to achieve the same retention properties. Another advantage of the detents resides in the creation of areas of axial engagement that resist axial displacement of the insert relative to the alignment ferrule.

According to another feature of the invention, the metal insert and the metal plunger have similar coefficients of thermal expansion to provide plunger retention over a broad operating temperature range thereby maintaining compressive forces on the bullet that keep the bullet in firm engagement with the fiber.

According to another feature of the invention, an axial displacement member urges forward a plunger having tines housed internal to the ferrule assembly. Tines, internal to the ferrule assembly, provide for easier connector assembly. Another advantage of the invention resides in a buffer retention point close to a fiber retention point which reduces the risk and amount of slippage of fiber relative to the buffer subsequent to connector assembly.

For an understanding of the invention, reference will now be made by way of example to a following detailed description in conjunction with accompanying drawings.

DESCRIPTION OF THE DRAWINGS

FIG. 1 is a three dimensional perspective view of parts for a preferred embodiment of the ferrule assembly.

FIG. 2 is a cross sectional view of the alignment ferrule lined with a preferred embodiment of the metal insert.

FIG. 3 is a cross sectional view of the ferrule assembly in its preassembled form.

FIG. 4 is a cross sectional view of the ferrule assembly in its assembled form.

FIG. 5 is a three dimensional perspective view of a bayonet style optical connector using the ferrule assembly.

DETAILED DESCRIPTION

With reference to FIG. 5, there is shown an alignment ferrule 1, a spring 2, a bayonet type coupling nut 3, a retention clip 4, an eyelet 5, a strain relief boot 6, and a stripped optical cable 7. The stripped optical cable 7 exposes a fiber 8, a coating 9, a buffer 10, and strength members 11.

With reference to FIG. 1 and FIG. 5, the alignment ferrule 1 is substantially cylindrical having a section with an enlarged collar 12 and another section to a rear of the alignment ferrule 1 having an annular channel 13. The alignment ferrule 1 receives the spring 2 that rests against a transverse face 14 created by the collar 12. The coupling nut 3 rests against the spring 2 and is held in place by the clip 4 snapped within the channel 13 creating a preassembled optical connector. FIG. 5 shows by way of example a bayonet style connector. The alignment ferrule 1 may, however, be housed within other types of connectors (not shown) including ST style, Fixed and Retractable Shroud Duplex, and SC style.

With reference to FIG. 2, an alignment ferrule 1 has a forward ferrule 16 having a fiber passage 17 therethrough to receive and align a fiber 8. The fiber passage 17 defines an axis 18 of the alignment ferrule 1. There is a substantially frustoconical tapered constriction 19 at a rear of the fiber passage 17 which opens into a larger diameter forward passage 20. The constriction 19 and forward passage 20 are coaxial with the fiber passage 17. A body 22 is molded over the forward ferrule 16 to create the alignment ferrule 1. The body 22 has a rearward passage 21 coaxial with the forward passage 20. The rearward passage 21 has a larger diameter than the forward passage 20. There is a tapered transition between the forward and rearward passages 20, 21. U.S. patent application Ser. No. 08/066,849 entitled "Overmolded Alignment Ferrule" filed May 25, 1993 by Edwards et al. (now abandoned) discloses a preferred embodiment of the alignment ferrule 1.

With reference to FIG. 3, housed within the alignment ferrule 1, there is a compressible bullet 24 made of a homogenous material that retains a memory of its undeformed shape. The bullet 24 is located within the forward passage 20 and is capable of being received by the constriction 19. The bullet 24 has an aperture 25 therethrough that is coaxial with the fiber passage 17. In a preferred embodiment, the bullet 24 has a frustoconical shape with three slots 26 on an outer surface of the bullet 24, equidistant from each other and parallel to an axis defined by the aperture 25. The preferred embodiment of the bullet 24 is disclosed in patent application Ser. No. 08/027,980 entitled "Insert For Positioning An Optical Fiber and An Optical Fiber Connector For Use Therewith" filed Mar. 8, 1993 by Edwards et al and now U.S. Pat. No. 5,341,447 issued Aug. 23, 1994.

A tubular metal insert 27 lines the rearward passage 21 and is positioned within the forward ferrule 16 subsequent to inserting the bullet 24 and prior to overmolding the body 22. The insert 27 has three annular grooves 28 on an outer surface of the insert 27 centrally disposed along its length. The overmolding process fills in the grooves 28 creating areas of axial engagement between the insert 27 and the body 22 that resist axial displacement of the insert 27 relative to the alignment ferrule 1. A forward insert portion 29 is forward of the grooves 28 and has an inner diameter smaller than an inner diameter of a rearward insert portion 30 which is rearward of the grooves. A transition from the forward insert portion 29 to the grooves 28 is tapered and defines an insert transition 23.

In the rearward insert portion 30 there are two sets of two opposing detents 31 that protrude radially inward. One set of detents is axially separated and rotated ninety degrees from the other set of detents. The overmolding process fills in the detents 31 on an outer surface of the insert 27 creating areas of axial engagement between the insert 27 and the body 22 that resist axial displacement of the insert 27 relative to the alignment ferrule 1.

A plunger 32 has a forward plunger portion 33 that fits within the forward passage 20 of the alignment ferrule 1. A rearward plunger portion 34 fits within the insert 27. A transition between outer diameters of the forward plunger portion 33 and the rearward plunger portion 34 defines a plunger shoulder 35 that prevents the rearward plunger portion 34 from ingress into the forward passage 20. The plunger 32 has a first passage 36, a second passage 37 having a larger inner diameter than the first passage 36, and a third passage 38 having a larger inner diameter than the second passage 37. A transition between the second passage 37 and the third passage 38 defines a plunger abutment 39. With reference to FIG. 1, three slits 40 in the rearward plunger portion 34 define three tines 41. Prior to plunger actuation, the plunger 32 is slidably mounted within the forward and rearward passages 20, 21 and is disengaged from the bullet 24. The tines 41 on the rearward plunger portion 34 are radially divergent from one another, and are constructed for radial deflection inwardly.

With reference to FIG. 3, a hollow axial displacement member 42 has an outer diameter that fits within the insert 27, coaxial with the fiber passage 17. In a preferred embodiment, the axial displacement member 42 is a metal tubular member. Prior to plunger actuation, a radially enlarged interference portion 43 located at a longitudinal center of the axial displacement member 42 interferes with a single set of the detents 31 in an interference fit. The interference fit retains the axial displacement member 42 within the alignment ferrule 1. Retention of the axial displacement member 42 also retains the plunger 32 within the alignment ferrule 1. There is an annular flange 44 at a rear of the insert 27 to funnel insertion of the bullet 24, the plunger 32, and the axial displacement mender 42 to create a ferrule assembly 15.

Upon assembly of the connector, with reference to FIG. 5, a fiber optic cable is prepared by stripping away outer layers of the cable to varying depths along a length of the cable to expose strength members 11, the buffer 10, the coating 9, and the fiber 8. After cable preparation, an installer threads the strain relief boot 6, the eyelet 5, and the preassembled optical connector over the stripped optical cable 7. In the case of a 900 micron buffered fiber, a transition between the buffer 10 and the coating 9 creates a buffer shoulder 45 that abuts the plunger abutment 39 preventing further ingress of the stripped optical cable 7.

With reference to FIG. 4, the axial displacement member 42 receives an axial crimping force upon connector assembly and transfers the axial force to the plunger 32. The axial force actuates the plunger 32 by urging it forward a fixed distance. The plunger 32 engages the bullet 24 and urges the bullet 24 into the constriction 19. Axial movement of the bullet 24 into the constriction 19 places a circumferential force on the bullet 24 and uniformly deforms the bullet 24 about the axis 18. In response to bullet deformation, the diameter of the aperture 25 reduces and engages the fiber 8. A fully actuated plunger 32, as shown in FIG. 4, creates sufficient engagement between the bullet 24 and the fiber 8 to resist axial displacement of the fiber 8 relative to the bullet 24.

Although a preferred embodiment of the ferrule assembly 15 consists of a plunger 32 having a shorter length than the forward and rearward passages 20, 21 in the ferrule assembly 15 used in conjunction with an axial displacement member 42, the invention does not preclude an embodiment having a plunger 32 that extends throughout the forward and rearward passages 20, 21 and dispensing with an axial displacement member. The axial displacement member 42 permits location of the tines 41 internal to the alignment ferrule 1. Tines 41 that are internal to the alignment ferrule 1 prevent entanglement of the tines 41 and fiber 8, because the stripped optical cable 7 will have been aligned for passage through the tines by being first threaded through the axial displacement member 42.

As the axial displacement member 42 urges the plunger 32 forward, the tines 41 of the plunger 32 engage the insert transition 23. As the tines 41 engage the insert transition 23, further forward movement of the plunger 32 produces circumferential forces on the tines 41, causing the tines 41 to collapse inwardly to grip the buffer 10.

The stripped optical cable 7 exposes layers such that when the plunger 32 is fully actuated, the bullet 24 receives the fiber 8, the second passage 37 receives the coating, and the third passage 38 receives the buffer 10. The grip of the tines 41 to the buffer 10 is sufficiently secure to resist axial movement of the buffer 10 relative to the plunger 32.

When the plunger 32 is fully actuated, the interference portion 43 of the axial displacement member 42 engages all of the detents 31 on the rearward insert portion 30 in an interference fit. The engagement of the detents 31 comprises a preferred interference fit between the insert 27 and the axial displacement member 42. The engagement of the detents 31 with the interference portion 43 of the axial displacement member 42 serves to retain the axial displacement member 42 in engagement with the plunger 32. The plunger 32, as a result of its engagement with the axial displacement member 42, maintains an axial force on the bullet 24. The axial force on the bullet 24 maintains the engagement between the bullet 24 and the fiber 8.

Retention strength of the interference fit between the plunger 32 or axial displacement member 42 and the insert 27 is greatest when both the plunger 32 or axial displacement member 42 and the insert 27 are metal. In order to achieve maximum retention strength over a broad operating temperature range, the metal materials of the plunger 32, the axial displacement member 42 and the insert 27 have a range of coefficients of thermal expansion within a same order of magnitude.

Subsequent to plunger actuation, the eyelet 5 slides over the strength men,hers 11 and a knurled end 46 of the alignment ferrule 1 and receives a radial crimping force. The stripped optical cable has exposed layers such that the strength members 11 do not interfere with the alignment ferrule 1 during the crimping process. The radial crimping force attaches the strength members 11 as well as deforming the insert 27 to create a redundant captivation of the axial displacement member 42. The boot 6 slides over the eyelet 5 to complete connector assembly. Excess fiber is cleaved and polished to achieve the desired finish.

We claim:
1. An optical termination comprising:
   a. a forward ferrule having a forward passage therethrough,
   b. a body having a rearward passage therethrough, said rearward passage being coaxial with said forward passage, wherein said body cooperates with said ferrule to form an alignment ferrule,
   c. a hollow metal insert lining said alignment ferrule,
   d. a hollow metal plunger movably disposed within said insert,
   e. a constriction within said forward passage,
   f. a deformable bullet having an aperture therethrough, said bullet being disposed within said forward passage, forward of said plunger, and rearward of said constriction, wherein said bullet is capable of being deformed by said plunger urging said bullet into said constriction, said aperture capable of responding to the deformation of said bullet by enclosing upon and gripping a fiber, and
   g. an interference fit between said insert and said plunger.

2. An optical connector as recited in claim 1 wherein, said insert has at least one annular groove engaging said alignment ferrule and resisting axial displacement of said insert relative to said alignment ferrule.

3. An optical connector as recited in claim 2 wherein, said interference fit comprises detents protruding radially inward of said insert engaging said plunger.

4. An optical connector as recited in claim 3 wherein, said plunger has a coefficient of thermal expansion similar to that of said insert.

5. An optical connector as recited in claim 1 wherein, said plunger has a rearward plunger portion with an outer diameter larger than an inner diameter of said insert, and further comprising at least two longitudinal slits creating tines in said rearward plunger portion permitting said rearward plunger portion to collapse inwardly upon engagement of said rearward plunger portion with said insert.

6. An optical connector as recited in claim 5 wherein, said interference fit comprises detents protruding radially inward of said insert engaging said plunger.

7. An optical connector as recited in claim 6 wherein, said plunger has a coefficient of expansion similar to said insert.

8. An optical connector as recited in claim 5 and further comprising a hollow axial displacement member movably disposed within said insert and positioned rearward of said plunger.

9. An optical connector as recited in claim 8 wherein, said interference fit comprises detents protruding radially inward of said insert engaging said plunger.

10. An optical connector as recited in claim 8 wherein, said plunger has a coefficient of expansion similar to said insert.

11. An optical connector as recited in claim 8 wherein, said insert has at least one annular groove engaging said alignment ferrule and resisting axial displacement of said insert relative to said alignment ferrule.

12. An optical connector as recited in claim 11 wherein, said plunger has a coefficient of expansion similar to said insert.

13. An optical connector as recited in claim 11 wherein, said interference fit comprises detents protruding radially inward of said insert engaging said plunger.

14. An optical connector as recited in claim 13 wherein, said plunger has a coefficient of expansion similar to said insert.

15. An optical connector as recited in claim 1 and further comprising a hollow axial displacement member movably disposed within said insert and positioned rearward of said plunger.

16. An optical connector as recited in claim 1 wherein, said interference fit comprises detents protruding radially inward of said insert engaging said plunger.

17. An optical connector as recited in claim 1 wherein, said plunger has a coefficient of expansion similar to said insert.

18. An optical connector as recited in claim 1 wherein, said forward ferrule and said body are of unitary construction.

19. An optical connector as recited in claim 1 wherein, said body portion is molded over said forward ferrule.

20. An optical connector comprising:
(a) a forward ferrule having a forward passage therethrough,
(b) a body having a rearward passage therethrough, said rearward passage being coaxial with said forward passage, wherein said body operates with said forward ferrule to form alignment ferrule,
(c) a hollow plunger movably disposed within said alignment ferrule,
(d) an axial displacement member movably disposed within said alignment ferrule and positioned rearward of and retaining said plunger,
(e) a constriction within said forward passage,
(f) a deformable bullet having an aperture therethrough, said bullet being disposed within said forward passage, forward of said plunger, and rearward of said constriction, wherein said bullet is capable of being deformed by said axial displacement member urging said plunger forward which urges said bullet into said constriction, said aperture capable of responding to the deformation of said bullet by enclosing upon and gripping a fiber wherein, said plunger has a rearward plunger portion with an outer diameter larger than an inner diameter of said body, and further comprising at least two longitudinal slits creating tines in said rearward plunger portion permitting said tines to collapse inwardly upon engagement of said rearward plunger portion with said body.

21. An optical connector as recited in claim 20 wherein, said forward ferrule and said body are of unitary construction.

22. An optical connector as recited in claim 20 wherein, said body portion is molded over said forward ferrule.

23. An optical connector comprising:
a. a forward ferrule having a forward passage therethrough,
b. a body having a rearward passage therethrough, said rearward passage being coaxial with said forward passage, wherein said body cooperates with said forward ferrule to form an alignment ferrule,
c. a fiber passing through said alignment ferrule,
d. a buffer encircling said fiber,
e. a hollow metal insert lining said alignment ferrule,
f. a hollow plunger within said insert having a rearward portion with tines collapsed upon said buffer thereby resisting axial displacement of said buffer relative to said alignment ferrule,
g. an axial displacement member disposed within said insert and positioned rearward of said plunger wherein said axial displacement member engages said insert thereby retaining said plunger,
h. a constriction within said forward passage,
i. a deformable bullet having an aperture therethrough and through which said fiber passes wherein said plunger compressibly retains said bullet within said constriction causing said aperture to circumferentially engage said fiber thereby resisting axial displacement of said fiber relative to said alignment ferrule.

* * * * *